(12) United States Patent
Lin

(10) Patent No.: US 7,382,524 B2
(45) Date of Patent: Jun. 3, 2008

(54) PHOTO-ELECTRONIC FREQUENCY MULTIPLIER

(75) Inventor: Jhy-Chain Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 59 days.

(21) Appl. No.: 11/438,014

(22) Filed: May 19, 2006

(65) Prior Publication Data

US 2007/0071446 A1    Mar. 29, 2007

(30) Foreign Application Priority Data

Sep. 23, 2005    (TW) .............................. 94133001 A

(51) Int. Cl.
  *G02F 1/35* (2006.01)
  *G02F 2/02* (2006.01)
(52) U.S. Cl. ...................................... 359/326; 398/187
(58) Field of Classification Search ........ 359/326–332; 398/187
See application file for complete search history.

(56) References Cited

U.S. PATENT DOCUMENTS 5,594,577 A * 1/1997 Majima et al. ............... 398/79
6,404,528 B1 * 6/2002 Pfeiffer ......................... 398/202
6,493,131 B1 * 12/2002 Tarng et al. ................. 359/326
7,031,042 B2 * 4/2006 Ogura ........................... 359/238

* cited by examiner

*Primary Examiner*—Sung Pak
*Assistant Examiner*—Daniel J Petkovsek
(74) *Attorney, Agent, or Firm*—Jeffrey T. Knapp

(57) ABSTRACT

An exemplary photo-electronic frequency multiplier (100) includes an intervening optical signal generator (10), a pair of photo-electronic conversion circuits (21, 22), a differential amplifier circuit (30), and a signal processing circuit (40). The intervening optical signal generator includes a light source (11), a first mirror (12), a first reflector (14), a second reflector (15), an optical phase modulator (16), and a second mirror (13). The intervening optical signal generator is for generating two intervening optical signals. Each photo-electronic conversion circuit is for converting one intervening optical signal into an electronic signal. The differential amplifier circuit is for multiplying the difference between the two electronic signals and outputting an amplifying signal. The signal processing circuit is for processing the amplifying signal to generate a signal having a plurality of frequency multiplications.

13 Claims, 1 Drawing Sheet

PHOTO-ELECTRONIC FREQUENCY MULTIPLIER

BACKGROUND OF THE INVENTION

1. Field of the Invention

The present invention generally relates to frequency multipliers and, more particularly, to a frequency multiplier having high frequencies.

2. Discussion of the Related Art

A frequency multiplier is commonly used in a radio receiver or radio transmitter to multiply a base frequency of an oscillator by a predetermined number. This multiplied frequency is then amplified and sent to the final drive stage and into an antenna tuning/coupling circuit for delivery to a transmitting antenna. The advantage is that a highly stable reference such as a crystal oscillator can be used, which may not be practical to manufacture for high frequencies.

Frequency multipliers use circuits tuned to a harmonic of the input frequency. Non-linear elements such as diodes may be added to enhance the production of harmonic frequencies. Usually amplifiers are inserted in a chain of frequency multipliers to insure adequate signal level at the final frequency. However, since the power in the harmonics declines rapidly, usually a frequency multiplier is tuned to only a small multiple (two, three, or five times) of the input frequency. In addition, since the tuned circuits have a limited bandwidth, if the base frequency is changed significantly (more than one percent or so), the multiplier stages may have to be adjusted; this can take significant time if there are many stages.

In digital electronics, frequency multipliers are often used along with frequency dividers and phase-locked loops to generate any desired frequency from an external reference frequency. The frequency multiplication is actually carried out quite cleverly in the phase-locked loop's feedback loop, by using a frequency divider on the output of the voltage controlled oscillator (VCO). This divided-down output is fed-back to the input comparator and compared to the reference frequency. Since the divided-down frequency is smaller than the reference frequency, the comparator transmits a voltage signal to the VCO, telling it to increase the output frequency. It continues to do this via the feedback loop, raising the VCO output frequency, until the divided-down frequency from the VCO output is equal to the reference frequency. At this point the comparator stabilizes and stops transmitting signals to the VCO, or only makes minor changes to maintain stability. The output frequency from the VCO will be stable at the input reference frequency multiplied by the value of the feedback divider. However, the frequency multipliers in digital electronics are very complex.

Therefore, a new frequency multiplier is desired in order to overcome the above-described shortcomings.

SUMMARY

A preferred embodiment thereof, a photo-electronic frequency multiplier includes an intervening optical signal generator, a pair of photo-electronic conversion circuits, a differential amplifier circuit, and a signal processing circuit. The intervening optical signal generator is for generating two intervening optical signals. The intervening optical signal generator includes a light source, a first mirror, a first reflector, a second reflector, an optical phase modulator, and a second mirror. The light source is for generating an incident optical signal. The first mirror is for separating the incident optical signal into two optical signals. The first reflector is for reflecting one of the optical signals. The second reflector is for reflecting the other of the optical signals. The optical phase modulator is for modulating a phase of the other optical signal. The second mirror is for converting the two optical signals into two intervening optical signals. Each photo-electronic conversion circuit is for converting one intervening optical signal into an electronic signal. The differential amplifier circuit is for multiplying the difference between the two electronic signals and outputting an amplifying signal. The signal processing circuit is for processing the amplifying signal to generate a signal having a plurality of frequency multiplications.

Other advantages and novel features of the embodiments will become more apparent from the following detailed description thereof when taken in conjunction with the accompanying drawings.

BRIEF DESCRIPTION OF THE DRAWING

Many aspects of the present photo-electronic frequency multiplier can be better understood with reference to the following drawing. The components in the drawing are not necessarily drawn to scale, the emphasis instead being placed upon clearly illustrating the principles of the photo-electronic frequency multiplier and its potential applications.

DETAILED DESCRIPTION OF THE EMBODIMENTS

Figure 1:
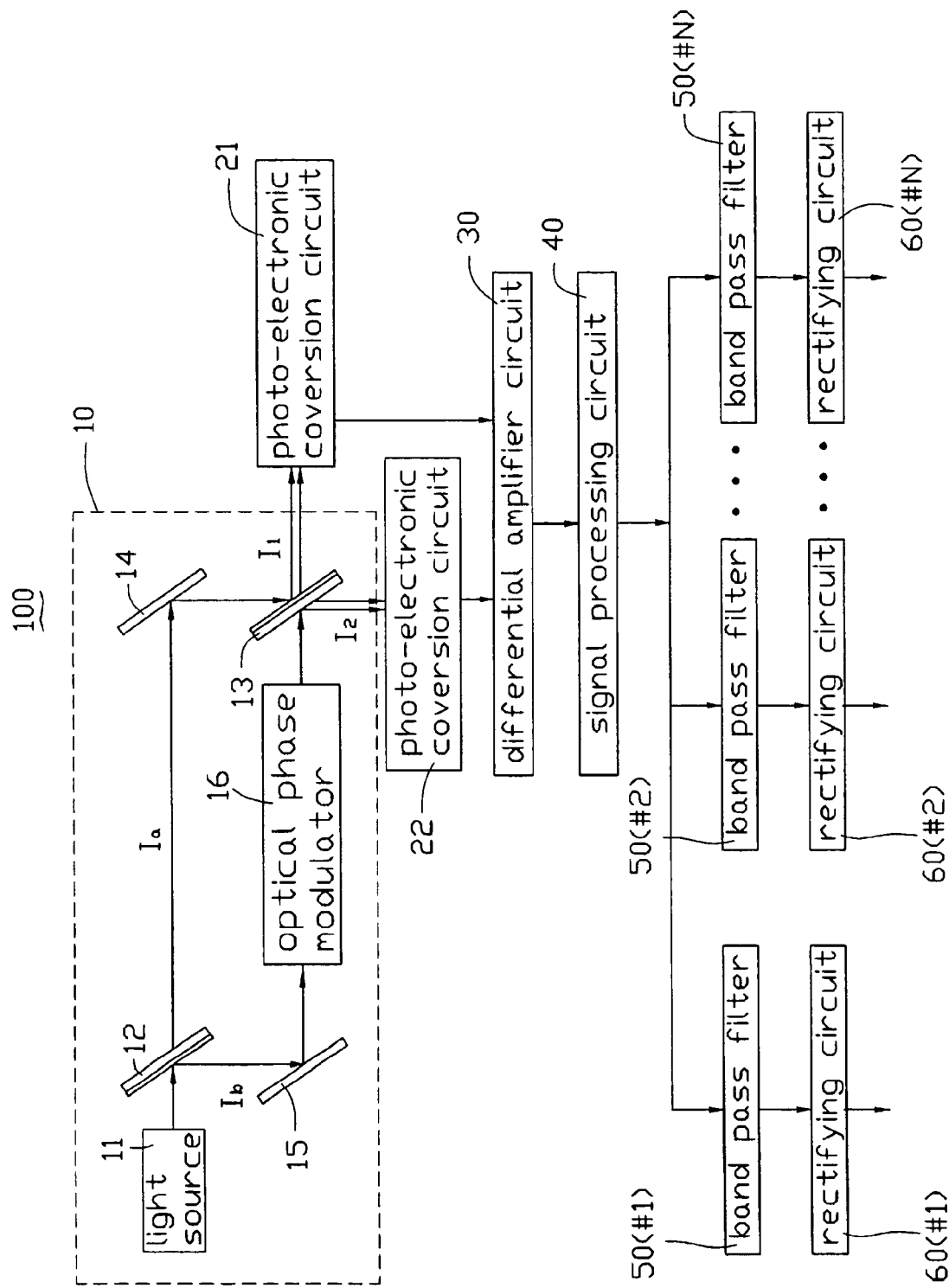
FIG. 1 is a block diagram of a photo-electronic frequency multiplier in accordance with a preferred embodiment of the present invention.

Referring now to the drawing in detail, FIG. 1 shows a photo-electronic frequency multiplier 100 according to a preferred embodiment of the present invention. The photo-electronic frequency multiplier 100 includes an intervening optical signal generator 10, a pair of photo-electronic conversion circuits 21 and 22, a differential amplifier circuit 30, a signal processing circuit 40, a plurality of band pass filters from 50(#1) to 50(#N), and a plurality of rectifying circuits from 60(#1) to 60(#N). N is an integer, which designates the number of the band pass filters, and at the same time designates the number of the rectifying circuits.

The intervening optical signal generator 10 generates two intervening optical signals. The intervening optical signal generator 10 includes a light source 11, a first mirror 12, a second mirror 13, a first reflector 14, a second reflector 15, and an optical phase modulator 16. The light source 11 is for generating an incident optical signal. The first mirror 12 is for separating the incident optical signal into two optical signals. The two optical signals outputted from the first mirror 12 are perpendicular to each other. The second mirror 13 is for converting two perpendicular optical signals into two perpendicular intervening optical signals. The first reflector 14 is for reflecting an optical signal in order to change the direction of the light path of the optical signal. The function of the second reflector 15 is similar to the first reflector 14. The optical phase modulator 16 is for modulating a phase of an optical signal. The optical signal modulated by the optical phase modulator 16 may be either a sine wave or a cosine wave.

Each of the photo-electronic conversion circuits 21 and 22 is for converting an optical signal into an electronic signal. Each of the photo-electronic conversion circuits 21 and 22 is separately and electronically connected with the differential amplifier circuit 30. The differential amplifier circuit 30 is a type of an electronic amplifier that multiplies the difference between two input signals. The differential amplifier circuit 30 is electronically connected with the signal processing circuit 40. The signal processing circuit 40 performs a Fourier transform of an inputted electronic signal in order to generate a signal having a plurality of frequency multiplications.

The signal processing circuit 40 is electronically connected with each of the band pass filters from 50(#1) to 50(#N). Each of the band pass filters from 50(#1) to 50(#N) selectively transmits a signal having a certain frequency. Each of the band pass filters from 50(#i) to 50(#N) is separately and electronically connected to a corresponding rectifying circuit 60. Each of the rectifying circuits from 60(#1) to 60(#N) receives a corresponding electronic signal having a certain frequency multiplication from one of the band pass filters from 50(#1) to 50(#N), rectifies the electronic signal, and outputs an electronic signal with certain frequency multiplication.

In operation, the light source 11 generates an incident optical signal onto the first mirror 12. The incident optical signal is separated into two optical signals $I_a$, $I_b$ by the first mirror 12. The light path of the optical signal $I_a$ is substantially perpendicular to the light path of the optical signal $I_b$. The optical signal $I_a$ outputted from the first mirror 12 travels to the first reflector 14. The light path of the optical signal $I_a$ is changed about 90 degrees by the first reflector 14 so that the optical signal $I_a$ travels to the second mirror 13. The optical signal $I_b$ outputted from the first mirror 12 travels to the second reflector 15. The light path of the optical signal $I_b$ is changed about 90 degrees by the second reflector 15 so that the optical signal $I_b$ travels to the optical phase modulator 16. The optical phase modulator 16 modulates the phase of the optical signal $I_b$. The modulated optical signal $I_b$ travels to the second mirror 13. The second mirror 13 converts the two perpendicular optical signals $I_a$, $I_b$ into two perpendicular intervening optical signals $I_1$, $I_2$.

The intervening optical signal $I_1$ travels to the photo-electronic conversion circuit 21 and is converted into a first electronic signal. The intervening optical signal $I_2$ travels to the photo-electronic conversion circuit 22 and is converted into a second electronic signal. The first and second electronic signals are transmitted to the differential amplifier circuit 30. The differential amplifier circuit 30 multiplies the difference between the first and second electronic signals and outputs an amplified signal to the signal processing circuit 40. The signal processing circuit 40 performs a Fourier transform of the amplified signal to generate a signal having a plurality of frequency multiplications.

The signal having a plurality of frequency multiplications outputted from the signal processing circuit 40 is transmitted to each of the band pass filters from 50(#1) to 50(#N). Each band pass filter 50 transmits an electronic signal having a certain frequency multiplication to a corresponding rectifying circuit 60. The rectifying circuit 60 rectifies the electronic signal and outputs a rectified electronic signal with certain frequency multiplication.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A photo-electronic frequency multiplier comprising:
    an intervening optical signal generator comprising:
        a light source configured for generating an incident optical signal;
        a first mirror configured for separating the incident optical signal into first and second optical signals;
        a first reflector configured for reflecting the first optical signal;
        a second reflector configured for reflecting the second optical signal;
        an optical phase modulator configured for modulating a phase of the second optical signal; and
        a second mirror configured for converting the first and second optical signals into two intervening optical signals;
    a pair of photo-electronic conversion circuits, each photo-electronic conversion circuit being configured for converting one corresponding intervening optical signal into an electronic signal;
    a differential amplifier circuit electronically connected with the photo-electronic conversion circuits for multiplying the difference between the two electronic signals and outputting an amplifying signal; and
    a signal processing circuit electronically connected with the differential amplifier circuit and configured for processing the amplifying signal to generate a signal having a plurality of frequency multiplications.

2. The photo-electronic frequency multiplier as claimed in claim 1, further comprising a plurality of band pass filters, wherein each band pass filter receives the signal having a plurality of frequency multiplications and outputs a signal having a certain frequency.

3. The photo-electronic frequency multiplier as claimed in claim 2, further comprising a plurality of rectifying circuit, wherein each rectifying circuit receives a signal from a corresponding band pass filter and rectifies the signal.

4. The photo-electronic frequency multiplier as claimed in claim 1, wherein the two optical signals separated by the first minor are perpendicular to each other.

5. The photo-electronic frequency multiplier as claimed in claim 1, wherein the first reflector reflects the optical signal to change its path about 90 degrees.

6. The photo-electronic frequency multiplier as claimed in claim 1, wherein the second reflector reflects the optical signal to change its path about 90 degrees.

7. The photo-electronic frequency multiplier as claimed in claim 1, wherein the optical signal modulated by the optical phase modulator is one of a sine wave and a cosine wave.

8. The photo-electronic frequency multiplier as claimed in claim 1, wherein the intervening optical signals are perpendicular to each other.

9. The photo-electronic frequency multiplier as claimed in claim 1, wherein the signal processing circuit performs a Fourier transform of the amplifying signal.

10. A photo-electronic frequency multiplier comprising:
    an intervening optical signal generator configured for generating first and second distinct intervening optical signals;
    a first photo-electronic conversion circuit configured for converting the first intervening optical signal into a first electronic signal;
    a second photo-electronic conversion circuit configured for converting the second intervening optical signal into a second electronic signal;
    a differential amplifier circuit electronically connected with the photo-electronic conversion circuits for multiplying the difference between the first and second electronic signals and outputting an amplifying signal; and a Fourier transform circuit electronically connected with the differential amplifier circuit and configured for processing the amplifying signal to generate a signal having a plurality of frequency multiplications by Fourier transform.

11. The photo-electronic frequency multiplier as claimed in claim 10, wherein the intervening optical signal generator includes a light source configured for generating a first optical signal and a second optical signal.

12. The photo-electronic frequency multiplier as claimed in claim 11, wherein the intervening optical signal generator includes an optical phase modulator configured for modulating a phase of the second optical signal.

13. The photo-electronic frequency multiplier as claimed in claim 12, wherein the intervening optical signal generator includes a mirror configured for convening the first optical signal and the second optical signal modulated by the optical phase modulator into two intervening optical signals.

* * * * *